Dec. 17, 1957 G. MAXON, JR 2,816,848
METHOD OF AND APPARATUS FOR SIMULTANEOUSLY FLAME-CUTTING
AND HARDENING TOOTHED OBJECTS
Filed Feb. 18, 1954 4 Sheets-Sheet 2
OLD
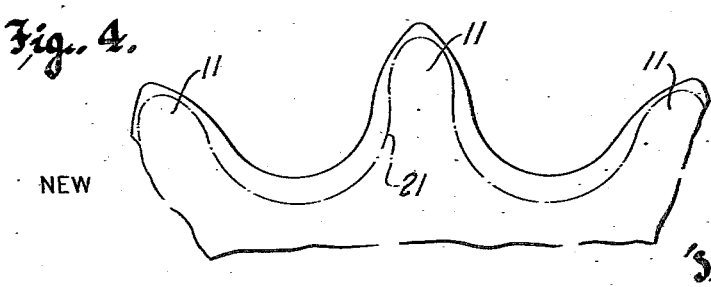
Fig. 4.
NEW
Inventor
Glenway Maxon Jr.

Fig. 5. OLD
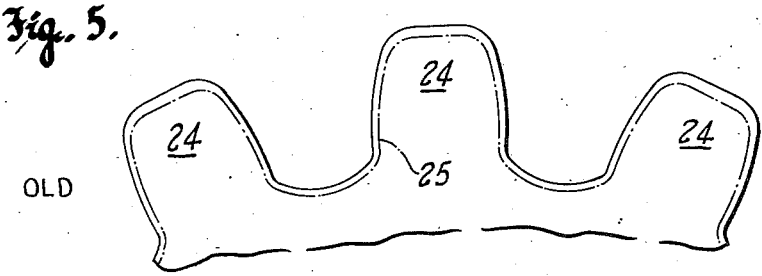
Fig. 6. NEW
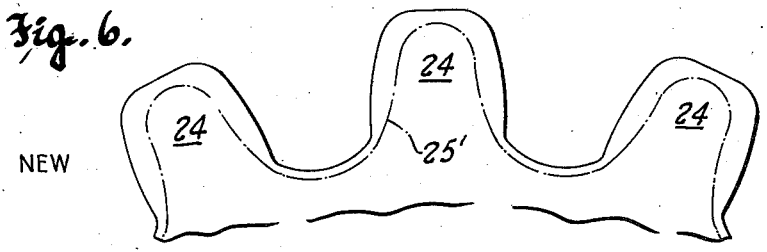
Fig. 7.
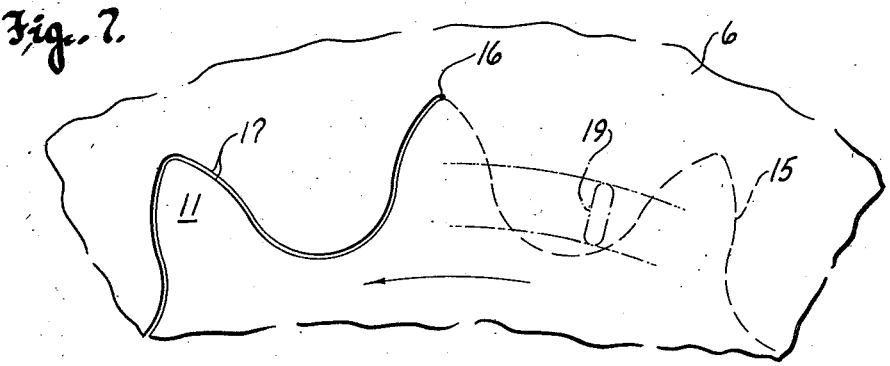
Fig. 8.
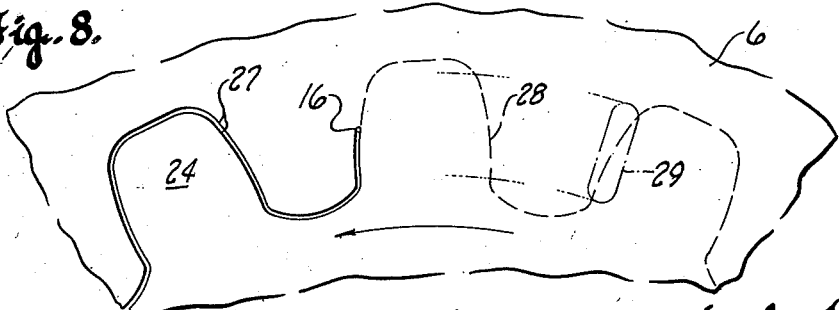
NOTE: PREHEATING FLAME 29 "ON" ONLY OVER FLANKS OF UNCUT TEETH
Inventor
Glenway Maxon Jr.

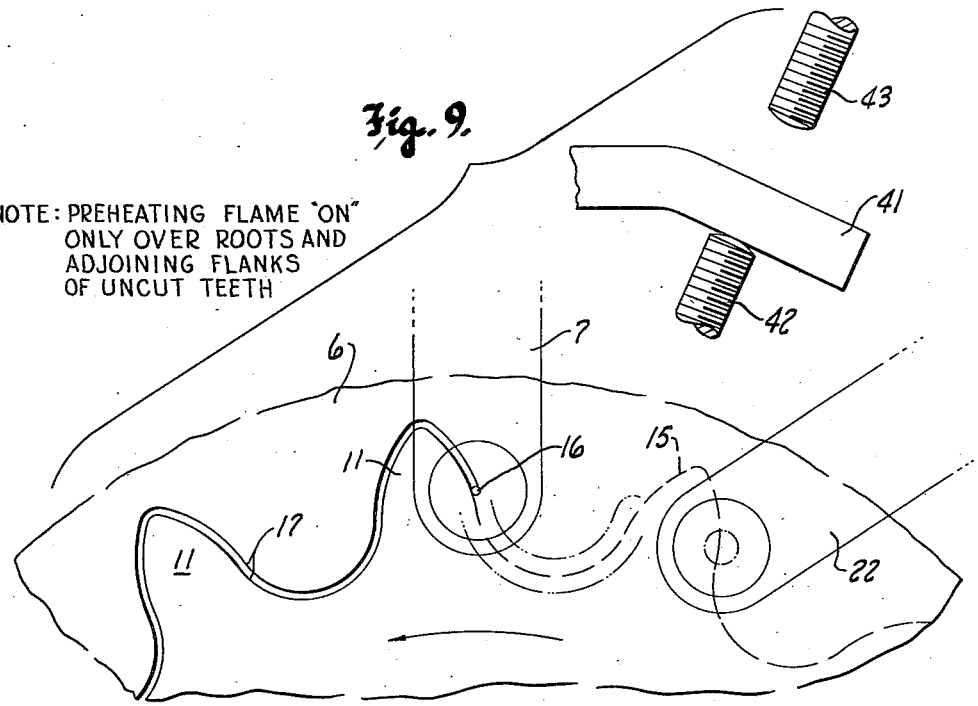
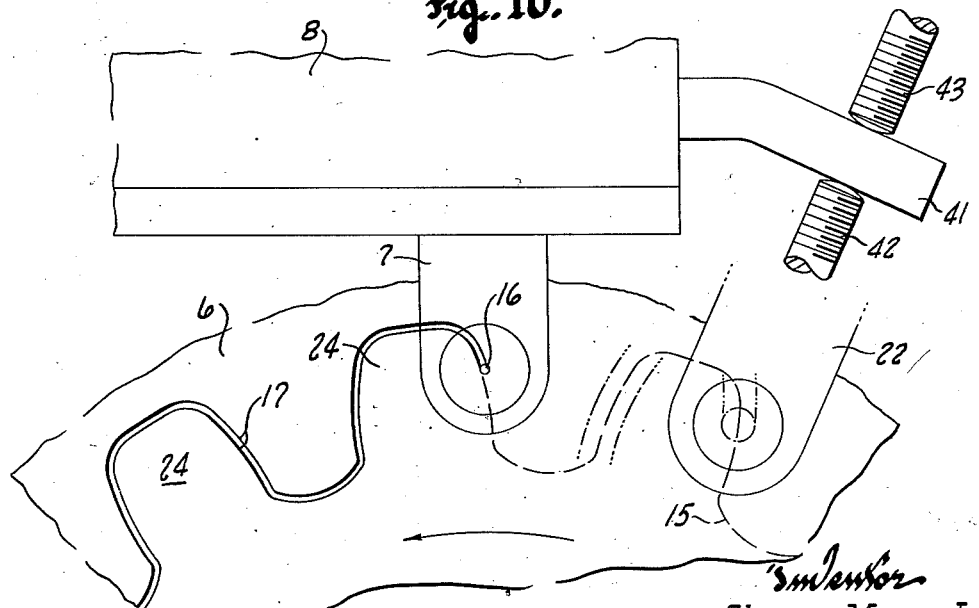

United States Patent Office 2,816,848
Patented Dec. 17, 1957

2,816,848

METHOD OF AND APPARATUS FOR SIMULTANEOUSLY FLAME-CUTTING AND HARDENING TOOTHED OBJECTS

Glenway Maxon, Jr., Milwaukee, Wis.

Application February 18, 1954, Serial No. 411,125

7 Claims. (Cl. 148—9)

This invention relates to the flame-cutting of hardenable metal blanks to form toothed objects such as gears, sprockets and the like, and has as its object the provision of a method wherein flame-cut teeth may be hardened simultaneously with the flame-cutting operation to a depth substantially greater than was hitherto possible due to any inherent hardening effect of the cutting flame on the metal being cut.

In general, it is the purpose of this invention to provide a method and apparatus for hardening the metal of a blank cut by a cutting torch, along the edges cut by the torch and during the flame-cutting operation, to thereby eliminate the need for costly and time-consuming subsequent hardening operations customarily required in the past in the production of such toothed objects as gears, sprockets and the like.

More specifically, it is a purpose of this invention to effect preheating of areas of a hardenable metal blank through which the flame of the cutting torch is to pass so that the metal of the blank will attain its critical hardening temperature during flame-cutting to a much greater depth from the surface of the cut than would be possible from the heat of the cutting flame alone. According to the method of this invention the blank to be flame-cut is preheated locally along the path the cutting flame is to follow, to a temperature below the melting point of the metal being flame-cut, preferably immediately prior to passage of the cutting flame through the preheated areas.

Another purpose of this invention resides in the provision of a method of flame-cutting toothed objects such as gears and sprockets and which involves the localized preheating of portions of a hardenable metal blank which are to become either the roots or the flanks of the teeth cut in the blank by the cutting torch, whereby in the case of flame-cut sprockets adjoining root and flank portions of the sprocket teeth may be hardened to a greater depth than the tip portions of the teeth; while in the case of gears the flanks of the teeth may be hardened considerably more than the roots of the teeth.

Still another object of this invention resides in the provision of flame-cutting apparatus which is exceptionally well suited for simultaneously cutting and hardening toothed objects such as gears, sprockets and the like.

With the above and other objects in view, which will appear as the description proceeds, this invention resides in the novel method and construction, combination and arrangement of parts of the apparatus substantially as hereinafter described and more particularly defined by the appended claims, it being understood that such changes in the precise embodiments of the hereindisclosed invention may be made as come within the scope of the claims.

The accompanying drawings illustrate several complete examples of the physical embodiments of the invention constructed according to the best modes so far devised for the practical application of the principles thereof, and in which:

Figure 4 is a view similar to Figure 3 but illustrating the manner in which the practice of the method of this invention effects hardening of adjoining flank and root portions of the sprocket teeth to a greater extent than the remaining portions of the teeth;

Figures 5 and 6 are diagrammatic views similar to Figures 3 and 4, respectively, but illustrating flame-cut gear teeth;

Figure 7 is a diagrammatic view of a fragment of a blank in which sprocket teeth are being flame-cut, illustrating one manner in which spaced localized areas of the blank which are to become adjoining flank and root portions of the sprocket teeth may be preheated to effect hardening of said portions to a greater extent than the remaining portions of the teeth during the flame-cutting operation;

Figure 8 is a diagrammatic view similar to Figure 7 but illustrating one method of achieving greater hardness along the flanks of gear teeth than at their roots and tips;

Figure 9 is a diagrammatic plan view illustrating another manner in which the preheating torch can be used to preheat selected portions of a blank in which sprocket teeth are being cut by the cutting torch; and Figure 10 is a similar diagrammatic view illustrating another manner in whch the preheating torch can be used to preheat selected areas of a blank in which gear teeth are being flame-cut.

Figure 1:
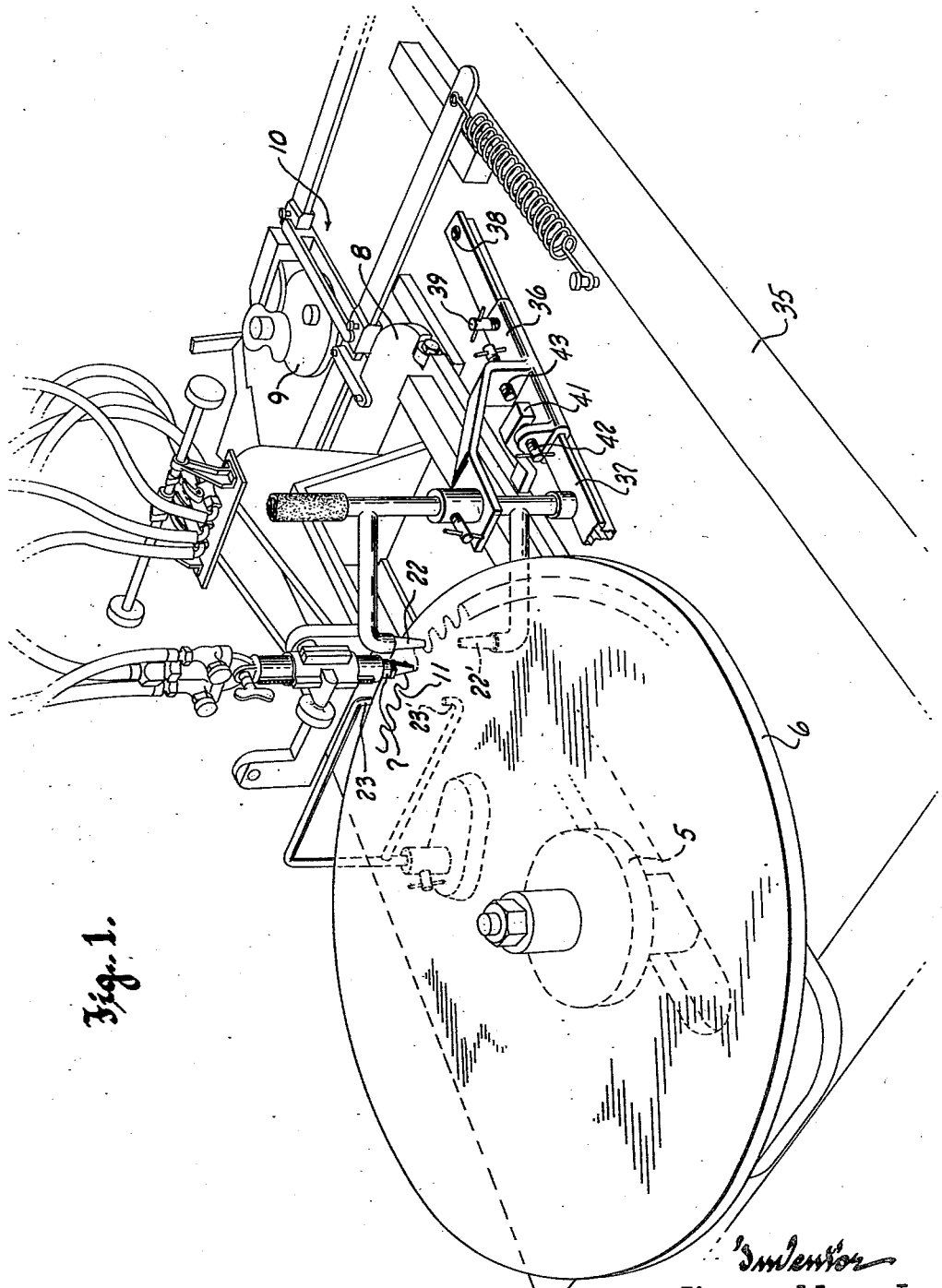
Figure 1 is a perspective view of the flame-cutting apparatus of this invention.

Referring now to the accompanying drawings, and especially Figure 1, the apparatus therein shown is in most respects identical to the flame-cutting machine disclosed in the patent to Glenway Maxon, Jr., No. 2,583,002 issued January 22, 1952. For a complete disclosure of the apparatus, reference may be had to the aforesaid patent, but for the purpose of this invention it will suffice to note that the apparatus comprises a rotatable work support 5 to which a hardenable metal blank 6 may be secured in a horizontal position to rotate therewith about a vertical axis; and a cutting torch 7 mounted on a carriage 8 which is constrained to reciprocatory motion along a horizontal path which intersects the axis of rotation of the work support.

The carriage 8 is reciprocated by a cam 9 operating through adjustable pantograph linkage 10. The cutting torch 7, of course, is mounted on the carriage to project its flame downwardly onto the upper face of the blank 6 into impingement with the peripheral portion thereof. Consequently, the combined rotary movement of the blank and the reciprocatory movement of the torch causes spaced teeth 11 to be cut in the edge portion of the blank.

Figure 3:
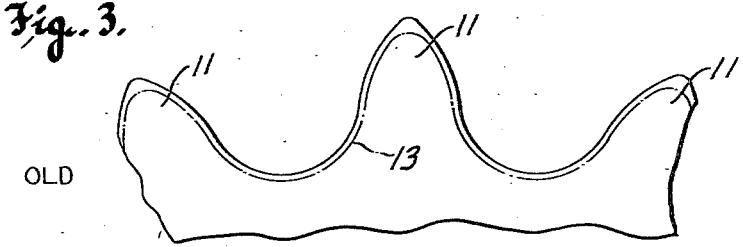
Figure 3 is a fragmentary view diagrammatically showing a portion of the toothed periphery of a sprocket which has been flame-cut by conventional methods.

The apparatus is adaptable to the cutting of a variety of toothed objects such as racks, gears and sprockets, and as indicated in Figure 3 the teeth 11 of a conventional flame-cut sprocket made by the apparatus of Patent No. 2,583,002 are normally hardened by the heat of the cutting flame to a depth indicated by the construction line 13. This results from the fact that the heat of the cutting flame raises the temperature of the metal along the edge of the cut to its critical hardening temperature to a limited extent, which may be somewhat exaggerated in Figure 3.

Due to the limited hardening effect of the cutting flame, it was often necessary, especially in the case of flame-cut sprockets intended for heavy duty service, to subject the sprockets to a heat-treating and hardening process following flame-cutting of the sprocket so as to not only increase the surface hardness of the teeth but to increase the depth of hardness along the flame-cut edges of the teeth. Needless to say, the conventional independent flame cutting and hardening technique practiced in the past was not only time consuming but costly.

The method of this invention overcomes these objections to past practices of separately flame-cutting and hardening toothed objects and enables hardening to be effected simultaneously with the flame-cutting operation. This is accomplished by preheating areas of a hardenable metal blank through which the cutting flame is to pass so that when the flame of the cutting torch impinges such preheated areas it effects heating of the metal to its critical hardening temperature to a far greater depth than was hitherto possible from the heat of the cutting flame alone.

By way of example one method of simultaneously flame-cutting and hardening sprocket teeth in accordance with this invention is shown diagrammatically in Figure 7. To more easily understand the invention it may be assumed that the cutting torch is traveling generally to the right (in Figure 7) along an imaginary line 15 corresponding to the shape of the sprocket teeth being cut, while the flame 16 of the cutting torch has cut teeth in the blank 6 as indicated by the double line 17 to the left of the flame.

It it is desired to increase the depth of hardness entirely around the root, flank and tip portions of the sprocket teeth, an area of the blank ahead of the torch equal to the full height of the teeth to be flame-cut may be preheated so that all of the areas traversed by the flame of the cutting torch will have been preheated prior to the passage of the cutting flame therethrough. In the case of sprocket teeth, however, it is desirable to increase the hardness of adjoining flank and root portions of the teeth, which receive greatest wear, to a greater extent than the extreme tip and root portions of the teeth. For this purpose a preheating flame 19 elongated in the direction of the height of the teeth to be cut may be directed onto one face of the blank to cover a localized area of the blank lying between the pitch and root diameters of the sprocket.

As indicated, the preheating flame is preferably applied to the blank a short distance ahead of the flame of the cutting torch, normally one tooth space or less.

During the passage of the cutting flame through the preheated areas of the blank the heat of the cutting flame raises the temperature of the metal along the adjoining flank and root portions of the teeth to its critical hardening temperature for a substantially greater depth than results at the remaining portions of the teeth 11, as indicated by the broken line 21 in Figure 4. Upon quenching of the flame-cut teeth with water immediately following the cutting of the teeth, the hardness of the flame-cut surfaces along the adjoining flank and root portions of the teeth may be on the order of 55 Rockwell C, and the hardness may extend to upwards of 3/16 of an inch inwardly from said surfaces, depending upon the preheating temperature.

When using the apparatus of Figure 1 to carry out the method of this invention, the hardening of the adjoining flank and root portions of sprocket teeth in the manner described may be effected by projecting the flame of a preheating or booster torch 22 onto the desired portion of the blank while the blank is rotated in a counter-clockwise direction to first bring the preheated areas under the cutting torch 7 and then to the quenching nozzle 23.

Figure 2:
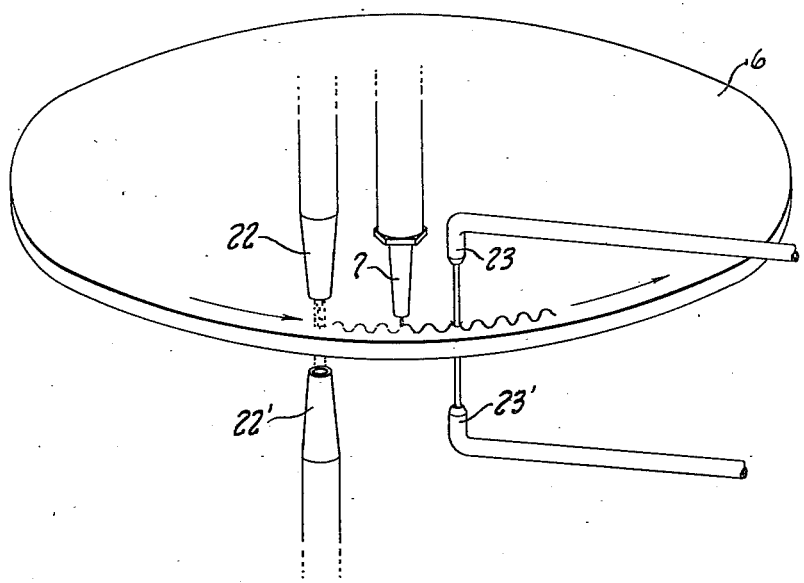
Figure 2 is a diagrammatic perspective view illustrating the arrangement of preheating and quenching members with respect to the cutting torch.

Obviously as seen best in Figure 2, opposite upper and lower preheating or booster torches 22 and 22', respectively, may be employed to secure the most uniform preheating of the blank; and upper and lower quenching nozzles 23 and 23', respectively, are preferably used at the side of the cutting torch remote from the preheating torches.

The continuous projection of one or more preheating flames onto the blank ahead of the cutting torch may result in hardening of the bases of the sprocket teeth and the extreme root areas of the sprocket to an undesirable depth which tends to render the teeth brittle. According to this invention, however, adequate toughness of the sprocket teeth may be achieved by the expedient of limiting preheating to only those areas of the blank which are to become the adjoining root and flank portions of the sprocket teeth. In other words, the flame 19 of a stationarily mounted booster torch may be turned on and off alternately in timed relation either to rotation of the blank or reciprocation of the cutting torch, to impinge and preheat only the adjoining flank and root portions of the uncut sprocket tooth ahead of that being cut by the flame of the cutting torch. As long as the preheating torches are quite close to the flame of the cutting torch, no special igniters for the preheating torches will be necessary.

When flame-cutting gears, the teeth 24 of the gears are ordinarily hardened to only a slight depth as indicated by the broken line 25 in Figure 5. If desired, however, the flanks of the teeth can be hardened by the method of this invention, during flame-cutting, to a considerably greater depth, as indicated by the broken line 25' in Figure 6, without materially increasing the depth of hardness at the roots and tips of the gear teeth. This is accomplished by projecting the flame of a stationarily mounted booster torch (or torches) onto the flanks of the uncut gear teeth to preheat them immediately prior to passage of the flame of the cutting torch therethrough, as seen in Figure 8. As therein shown, the double line 27 indicates the path of the cutting flame 16 through the blank, and the broken line 28 indicates the outline of the gear teeth to be cut in the blank. The flame 29 of the booster torch is elongated radially of the gear teeth and is shown impinging the flank of the uncut tooth adjacent to that being cut by the flame 16 of the cutting torch.

Again in this case, the flame of the booster torch (or torches) may be made to impinge selected areas of the blank being flame-cut, namely those areas of the blank which are to become the flanks of the teeth being flame-cut. Thus the booster torches can be turned on only to direct their flames onto the flanks of the uncut gear teeth, to preclude heating and subsequent hardening of the roots and tips of the teeth, with the result that the flanks of the gear teeth will be heated to a higher temperature by the cutting flame, and the metal inwardly of the flanks will attain its critical hardening temperature to a substantially greater depth than the root and tip areas of the teeth. The flame of the booster torch (or torches) of course, can be turned on and off in timed relation either to rotation of the blank being flame-cut, or in timed relation to reciprocation of the cutting torch.

In all cases, therefore, areas of the blank being flame-cut and through which the flame of the cutting torch is to pass are preheated by the flame of a preheating torch a short distance ahead of the cutting torch 7, and the flame-cut portions of the blank may be quenched with water discharged in a relatively fine stream from the quenching nozzle 23 (or nozzles) mounted alongside the cutting torch at the side thereof remote from the preheating torch.

While the preheating torch or torches may be mounted upon the base 35 of the flame-cutting apparatus in any desirable manner a carriage 36 may be provided for these torches, as shown in Figure 1. The carriage is mounted upon a rail 37 alongside the carriage 8 for the cutting torch, and is secured to the top of the base as by screws 38, preferably with the rail at a slight angle to the carriage 8 and substantially radial to the axis of the rotatable work support 5.

The rail 37 thus provides a support for the carriage 36 enabling it to be reciprocated back and forth in timed relation to the motion of the cutting torch, along a path lengthwise adjacent to that of the cutting torch, and enabling the preheating torch (or torches) to be held in any desired position of adjustment along the length of the rail, as by a screw 39 passing through the carriage 36 and bearing against the rail 37. For instance, during the flame-cutting of sprocket teeth when it is desired to preheat and harden only those areas of the blank which are to become the adjoining flank and root portions of the teeth, the carriage 36 may be locked on the rail 37 by the screw 39 in a position on the rail at which the flame of the preheating torch (or torches) will impinge the desired areas of the blank 6.

For cutting gear teeth and simultaneously effecting hardening of the flanks of the flame-cut teeth, the screw 39 may be loosened to allow the carriage 36 to be moved back and forth toward and from the axis of the work support 5 for preheating of those areas of the blank which are to become the flanks of the gear teeth.

The preheating torch (or torches) may be reciprocated in unison wtih the cutting torch, as for the preheating necessary to effect hardening of the flanks of gear teeth being flame-cut, by means of cooperating driving abutments on the carriages for the cutting and preheating torches. For example, the driving abutment 41 on the carriage 8 may be secured thereto for adjustment along its length, by means not shown, and projects toward the carriage 36 to extend between the ends of opposing screw threaded abutments 42 and 43 on the booster torch carriage.

Thus the screw threaded abutments, when brought into engagement with the opposite sides of the driving abutment 41, constrain the carriage 36 to reciprocate with the carriage 8 of the cutting torch, as indicated diagrammatically in Figure 10, permitting those areas of the blank which are to become the flanks of the gear teeth to be preheated just before they reach the cutting torch. It will be understood, of course, that the flame of the booster torch (or torches) may be extinguished each time the torches reach their limits of back and forth motion, to avoid hardening of the root and tip portions of the gear teeth. This may be readily accomplished by means under the control of the drive means for the carriage 8, or by the back and forth motion of the carriage itself.

The provision of adjustable screw threaded abutments 42 and 43 on the carriage 36, also enable a lost motion driving connection to be established between the carriages 8 and 36, useful for example, in the hardening of certain selected areas of the blank through which the flame of the cutting torch is to pass. As seen in Figure 9, the screw threaded abutments 42 and 43 may be adjusted to permit a limited degree of free travel of the driving abutment 41 therebetween, so that the booster torch (or torches) will act only upon a limited area of the blank being flame-cut, namely those areas which are to become adjoining root and flank portions of sprocket teeth. In this case, the booster torch (or torches) reciprocate with the cutting torch, but the reciprocatory motion of the booster carriage 36 is confined to a range corresponding to the radial distance between the pitch and root diameters of the sprocket teeth being cut, due to the lost motion in the driving connection between the carriages 8 and 36.

In this latter case, it will again be understood that the flame of the booster torch (or torches) may be extinguished as soon as it has been retracted the maximum amount to bring its flame out to approximately the pitch diameter of the sprocket teeth, so that the preheating flame will not impinge those areas of the blank which lie along the pitch circle of the sprocket being flame-cut.

Obviously, the screw threaded abutments 42 and 43 are adjusted to clear the driving abutment 41 for its full range of motion if the booster torch (or torches) are to remain stationary and preheating is to be controlled solely by turning the preheating flames off and on.

From the foregoing description, taken with the accompanying drawings, it will be readily apparent to those skilled in the art that this invention greatly simplifies the flame-cutting and hardening of toothed objects, such as gears and sprockets, by enabling the hardening of the teeth of such objects to be effected simultaneously with the flame-cutting operation.

What I claim as my invention is:

1. In a flame cutting machine for cutting toothed objects, and of the type having a blank support movable to carry a blank along a predetermined path, another support having a cutting torch mounted thereon in position to have its flame impinge one face of the blank, and means mounting said supports for relative motion toward and from one another along a defined path which traverses said path of movement of the blank: drive means for recurrently effecting such relative motion of said supports toward and from one another between defined limits, to effect cutting of spaced teeth in the blank during movement of the blank along its said path; and means for simultaneously hardening the teeth cut in the blank by the cutting torch, comprising a booster torch, means movably mounting the booster torch on the machine ahead of the cutting torch and in position to have its flame impinge and preheat a portion of the blank through which the flame of the cutting torch is to pass, means governed by said drive means for moving said booster torch, back and forth along the portion of the blank through which the flame of the cutting torch is to pass to effect preheating of said portions of the blank to a temperature below the melting point of the metal of the blank, whereby during flame cutting, the metal at said preheated areas attains its critical hardening temperature to a greater depth, from the surface of the cut, than would be possible from the heat of the cutting torch alone, a quenching nozzle independent of the cutting and booster torches, and means mounting the quenching nozzle on the machine adjacent to the cutting torch, at the side thereof remote from the booster torch.

2. In the method of flame cutting toothed objects such as gears from hardenable metal blanks, the characterizing steps of: while teeth are being cut in the blank by a cutting torch and independently of said torch, locally heating narrow zones of the blank across which the flame of the cutting torch is to pass in cutting the flanks of the teeth, immediately prior to flame cutting the flanks of the teeth, to raise the temperature of the metal at said zones to a value less than the melting point of the metal, so that the preheated metal along the flanks of the teeth being cut by the flame attains its critical hardening temperature to a greater depth than the metal along the roots of the teeth and outside of said zone; and quenching the flame cut flanks of the teeth at a zone remote from that at which localized preheating is taking place.

3. In the method of flame cutting toothed objects such as sprockets from hardenable metal blanks, the characterizing steps of: while teeth are being cut in the blank by a cutting torch, and independently of said torch, locally heating narrow zones of the blank through which the flame of the cutting torch is to pass in cutting the adjoining flank and root portions of the teeth, inwardly of areas which are to become the points of such teeth, immediately prior to flame cutting said adjoining flank and root portions of the teeth, to raise the temperature of the metal at said zones to a value less than the melting point of the metal, so that the preheated metal along said flank and root portions of the teeth attains its critical hardening temperature when cut by the flame to a greater depth than the metal along the tips of the teeth and outside said zones; and quenching said flank and root portions of the flame cut teeth at a zone remote from that at which localized preheating is taking place.

4. Apparatus for simultaneously flame cutting and hardening teeth in a hardenable metal blank, comprising the combination of: a cutting torch; a torch carrier on the apparatus mounting the cutting torch for back and forth motion between defined limits along a predetermined path; means for imparting back and forth motion to said carrier; means for advancing a blank along a predetermined path which traverses the path of travel of the torch so that teeth will be cut in the blank by the cutting torch as a consequence of the combined motions of the blank and the cutting torch; a preheating torch; means mounting the preheating torch on the apparatus for back and forth motion along a predetermined path lengthwise adjacent to that of the cutting torch but spaced therefrom in a direction opposite to that in which the blank travels; said preheating torch being positioned to have its flame impinge an area of the blank ahead of the cutting torch and through which the flame of the cutting torch is to pass to preheat said area to a temperature below the melting point of the metal being flame cut; and means providing a motion transmitting connection between said torches through which back and forth motion is imparted to the preheating torch as a consequence of back and forth motion of the cutting torch.

5. The apparatus of claim 4 wherein said last named means comprises transiently engaging abutment means connected with the cutting and preheating torches and cooperating to provide a lost motion driving connection between the cutting and preheating torches, through which only a part of the back and forth motion of the cutting torch is transmitted to the preheating torch.

6. The apparatus of claim 4 wherein the abutment means connected with one of said torches is adjustable relative to the abutment means connected with the other of said torches in the direction of back and forth motion of the torches to provide for back and forth motion of the preheating torch in any of a number of zones lengthwise displaced from one another along the path of motion of the preheating torch.

7. The apparatus of claim 4 further characterized by the provision of a quenching nozzle for directing a stream of quenching fluid onto the teeth cut in the blank by the cutting torch; and means mounting the quenching nozzle on the apparatus adjacent to the cutting torch, at the side thereof remote from the preheating torch.

References Cited in the file of this patent

UNITED STATES PATENTS

| | | |
|---|---|---|
| 1,728,104 | Claude | Sept. 10, 1929 |
| 1,917,497 | Coberly | July 11, 1933 |
| 2,288,026 | Rea | June 30, 1942 |
| 2,428,825 | Arnoldy | Oct. 14, 1947 |
| 2,464,351 | Shorter | Mar. 15, 1949 |
| 2,574,100 | Gettys et al. | Nov. 6, 1951 |
| 2,583,002 | Maxon, Jr. | Jan. 22, 1952 |